(12) United States Patent
Breault

(10) Patent No.: US 6,841,283 B2
(45) Date of Patent: Jan. 11, 2005

(54) HIGH WATER PERMEABILITY PROTON EXCHANGE MEMBRANE

(75) Inventor: Richard D. Breault, North Kingstown, RI (US)

(73) Assignee: UTC Fuel Cells, LLC, South Windsor, CT (US)

( * ) Notice: Subject to any disclaimer, the term of this patent is extended or adjusted under 35 U.S.C. 154(b) by 276 days.

(21) Appl. No.: 10/274,747

(22) Filed: Oct. 21, 2002

(65) Prior Publication Data

US 2004/0076865 A1 Apr. 22, 2004

(51) Int. Cl.$^7$ ................................................. H01M 8/10
(52) U.S. Cl. ........................... 429/30; 429/33; 429/40; 429/41; 429/309; 521/27
(58) Field of Search ............................. 429/30, 33, 40, 429/41, 309; 521/27

(56) References Cited

U.S. PATENT DOCUMENTS

| 4,017,664 A | 4/1977 | Breault |
| 5,547,551 A | 8/1996 | Bahar et al. |
| 5,599,614 A | 2/1997 | Bahar et al. |
| 6,248,469 B1 * | 6/2001 | Formato et al. ............... 521/27 |

* cited by examiner

Primary Examiner—Laura Weiner
(74) Attorney, Agent, or Firm—Malcolm J. Chisholm, Jr.

(57) ABSTRACT

A high water permeability proton exchange membrane (12) is disclosed for use in an electrochemical cell, such as a fuel cell (10) or an electrolysis cell. The membrane (12) includes: a. between about 20 volume percent ("vol. %") and about 40 vol. % of a structural insulating phase (40); between about 50 vol. % and about 70 vol. % of a hydrated nanoporous ionomer phase (42); and, about 10 vol. % of a microporous water-filled phase (44). The structural insulating material (40) defines an overall membrane volume, and the ionomer phase (42) fills all but 10% of the overall volume so that the microporous water-filled phase (44) is defined within the ionomer phase (42) and consists of open pores having a diameter of between 0.3 microns and 1.0 microns. Water transport is enhanced between opposed catalytic surfaces (14), (16) of the membrane (12).

9 Claims, 2 Drawing Sheets

HIGH WATER PERMEABILITY PROTON EXCHANGE MEMBRANE

TECHNICAL FIELD

The present invention relates to electrochemical cells such as stacks of electrochemical cells used in fuel or electrolysis cells, and especially relates to a high water permeability proton exchange membrane for use as an electrolyte in such an electrochemical cell.

BACKGROUND ART

Electrochemical cells are commonly used in a fuel cell configuration to produce electrical energy from reducing and oxidant fluid streams, or in an electrolysis cell configuration to produce product gases from a supply fluid such as producing hydrogen and oxygen gas from water, as is well known. Typical applications employ a plurality of planar cells arranged in a stack surrounded by an electrically insulating frame that defines manifolds for directing flow of reactant and product fluids. Electrochemical cells typically include an anode electrode and a cathode electrode separated by an electrolyte. In both fuel cells and electrolysis cells, operating efficiencies are enhanced by increased water permeability of a proton exchange membrane electrolyte.

For example, in a fuel cell configuration, it is common and well known to utilize a proton exchange membrane ("PEM") as the electrolyte. Protons formed at the anode electrode move through the electrolyte to the cathode electrode, and it is generally understood that for each proton moving from the anode side to the cathode side of the electrolyte, approximately three molecules of water are dragged with the proton to the cathode side of the electrolyte. To prevent dry-out of the PEM, that dragged water must be replaced or returned to the anode side of the PEM by osmotic flow. Osmotic flow requires that the water content at the anode side of the PEM be less than at the cathode side to provide the required driving force. Additionally, during operation of the fuel cell, water is produced ("product water") at the cathode catalyst, and that product water must be removed by flowing it to either the anode side through the PEM, through a water transport plate in fluid communication with the cathode catalyst, or by entrainment or evaporation within the process oxidant stream passing by the cathode catalyst. Therefore, significant hydraulic pressure is required to remove the product water, especially at peak current densities of 2 amps per square centimeter ("ASCM") or greater expected for fuel cells utilized in automobiles.

It is critical that a proper water balance be maintained between a rate at which water is removed from the cathode electrode and at which liquid water is supplied to the anode electrode. If insufficient water is returned to the anode electrode, adjacent portions of the PEM electrolyte dry out thereby decreasing a rate at which hydrogen ions may be transferred through the PEM and also resulting in cross-over of the reactant fluid leading to local over heating. Dry-out of the PEM electrolyte also results in degradation of the PEM electrolyte, as is known. Similarly if insufficient product water is removed from the cathode electrode, the cathode may become flooded effectively limiting oxidant supply to the cathode and hence decreasing current flow.

Many approaches have been undertaken to enhance water transport of an electrochemical cell, including efforts to increase water permeability of the PEM. Those efforts include decreasing a thickness of the PEM, such as by production of an ultra-thin integral composite membrane disclosed in U.S. Pat. No. 5,547,551 to Bahar et al., that issued on Aug. 20, 1996, and U.S. Pat. No. 5,599,614 that also issued to Bahar et al. on Feb. 4, 1997. While ultra-thin PEM electrolytes have enhanced water permeability, nonetheless, significant electrochemical cell performance limits result from restricted PEM water permeability. For example, localized membrane degradation is known to occur due to dry-out of the PEM at reactant inlets of a fuel cell. Additionally, fuel cell durability and performance is known to be degraded as a result of catalyst flooding with product water. Accordingly, there is a need for a proton exchange membrane with increased water permeability.

DISCLOSURE OF INVENTION

A high water permeability proton exchange membrane is disclosed for use in an electrochemical cell, such as a fuel cell or an electrolysis cell. The high water permeability proton exchange membrane includes: a. between about 20 volume percent ("vol. %") and about 40 vol. % of a structural insulating phase; between about 50 vol. % and about 70 vol. % of a hydrated nanoporous ionomer phase; and, about 10 vol. % of a microporous water-filled phase. The structural insulating phase consists of particulate or fibrous materials that are non-conductive and compatible with an operating environment of an electrochemical cell, such as silicon carbide. The hydrated nanoporous ionomer phase consists of any suitable cation exchange resin that is compatible with an operating environment of an electrochemical cell. The microporous water-filled phase consists of open pores having a diameter of between 0.3–1.0 microns defined within the hydrated nanoporous ionomer phase. By the phrase "open pores", it is meant that the pores or voids provide an open channel for movement of water through a thickness of the membrane.

A method of making the high water permeability proton exchange membrane includes the steps of positioning the materials making up the structural insulating phase to define an overall membrane volume, and then filling all but 10% of the overall membrane volume with material making up the hydrated nanoporous ionomer phase. Due to capillary forces, the ionomer phase material moves to be uniformly dispersed throughout the membrane void volume. However, because the hydrated nanoporous ionomer phase materials have been added to fill all but 10% of the overall membrane volume, the unfilled 10% become the microporous water-filled phase defined within the nanoporous ionomer phase. For example, the structural insulating phase materials may be positioned into the form of a non-woven paper having dimensions of a desired proton exchange membrane. The non-woven paper may then be impregnated with an appropriate amount of the material making up the hydrated nanoporous ionomer phase within an ethanol solution. The ethanol may then be removed by drying to form the high water permeability proton exchange membrane.

In a preferred embodiment, the structural insulating material includes silicon carbide whiskers having an average length of about 5–10 microns, and an average diameter of about 1 micron; the hydrated nanoporous ionomer phase consists of a perflourosulfonic acid ionomer; and, the resulting high water permeability proton exchange membrane is preferably about 10–25 microns thick.

Accordingly it is a general purpose of the present invention to provide a high water permeability proton exchange membrane for use in electrochemical cells that overcomes deficiencies of the prior art.

It is a more specific purpose to provide a high water permeability proton exchange membrane that enhances water permeability throughout catalyst surfaces of the membrane.

These and other purposes and advantages of the present high water permeability proton exchange membrane will become more readily apparent when the following description is read in conjunction with the accompanying drawings.

DESCRIPTION OF THE PREFERRED EMBODIMENTS

Figure 1:
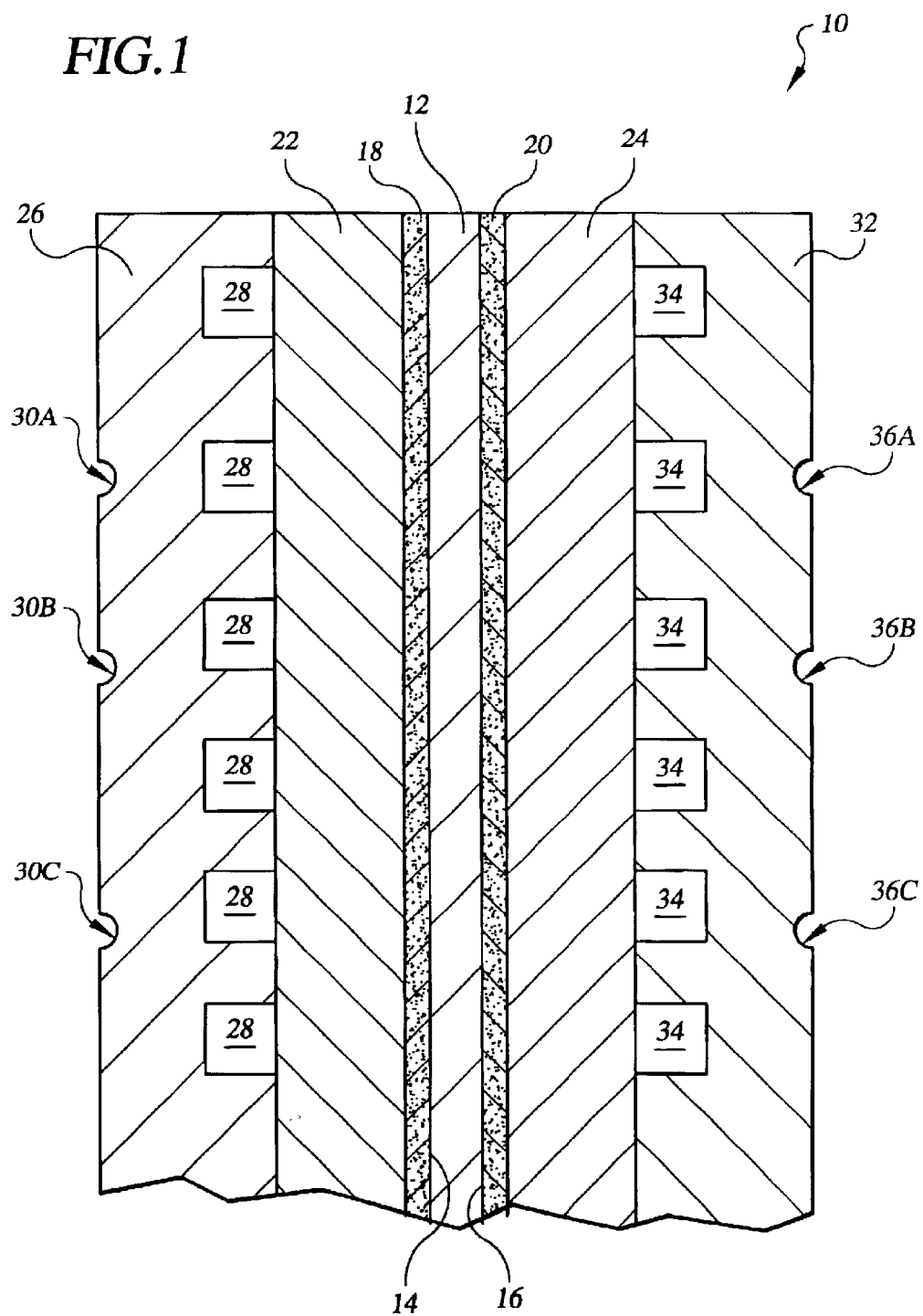
FIG. 1 is a schematic, cross-section representation of a fuel cell employing a high water permeability proton exchange membrane constructed in accordance with the present invention.

Referring to the drawings in detail, an electrochemical cell, such as a fuel cell 10 is shown schematically as a working environment for a high water permeability proton exchange membrane ("PEM") 12. The high water permeability PEM 12 is shown having a first catalyst surface 14 and an opposed second catalyst surface 16. An anode catalyst 18 and a cathode catalyst 20 are supported adjacent to the opposed first and second catalyst surfaces 14, 16 of the PEM 12. A porous anode substrate 22 is secured adjacent to the anode catalyst 18, and a porous cathode substrate 24 is secured adjacent to the cathode catalyst 20. An anode water transport plate 26 is secured adjacent to the anode substrate 22, and the anode water transport plate 26 defines a reducing fluid distribution network 28 and a plurality of anode side water channels 30A, 30B, 30C. A cathode water transport plate 32 is secured adjacent to the cathode substrate 24, and the cathode water transport plate 32 defines a process oxidant distribution network 34, and a plurality of cathode side water channels 36A, 36B, 36C.

As is well known in the art, such a fuel cell 10 would be disposed with a plurality of virtually identical cells in a well known fuel cell stack assembly (not shown) so that the water channels of adjacent fuel cells cooperate to define closed channels, and the fuel cells are secured within a frame (not shown) defining manifolds or conduits to direct the reactant fluids into the cells and the product fluids and electricity out of the fuel cells and stack.

In operation, a reducing fluid stream is directed to flow through the reducing fluid distribution network 28 while a process oxidant stream is directed to flow through the process oxidant distribution network 34, and water is directed to flow through the anode and cathode side water channels 30A, 30B, 30C, 36A, 36B, 36C to fill the porous anode and cathode water transport plates 26, 32. The reducing fluid electrochemically reacts at the anode catalyst 18 so that electrons move into a load circuit (not shown) and protons move through the high water permeability PEM 12 to the cathode electrode catalyst 20, where the protons combine with the process oxidant to produce water and heat. Some of the product water then moves from the second or cathode catalyst surface 16 of the PEM through the PEM back to the first or anode catalyst surface 14. Additional product water flows through the cathode substrate 24 and then into the porous cathode water transport plate 32 to move into the cathode water channels, or into the process oxidant distribution network 34 to be entrained or evaporated with the process oxidant stream.

Figure 2:
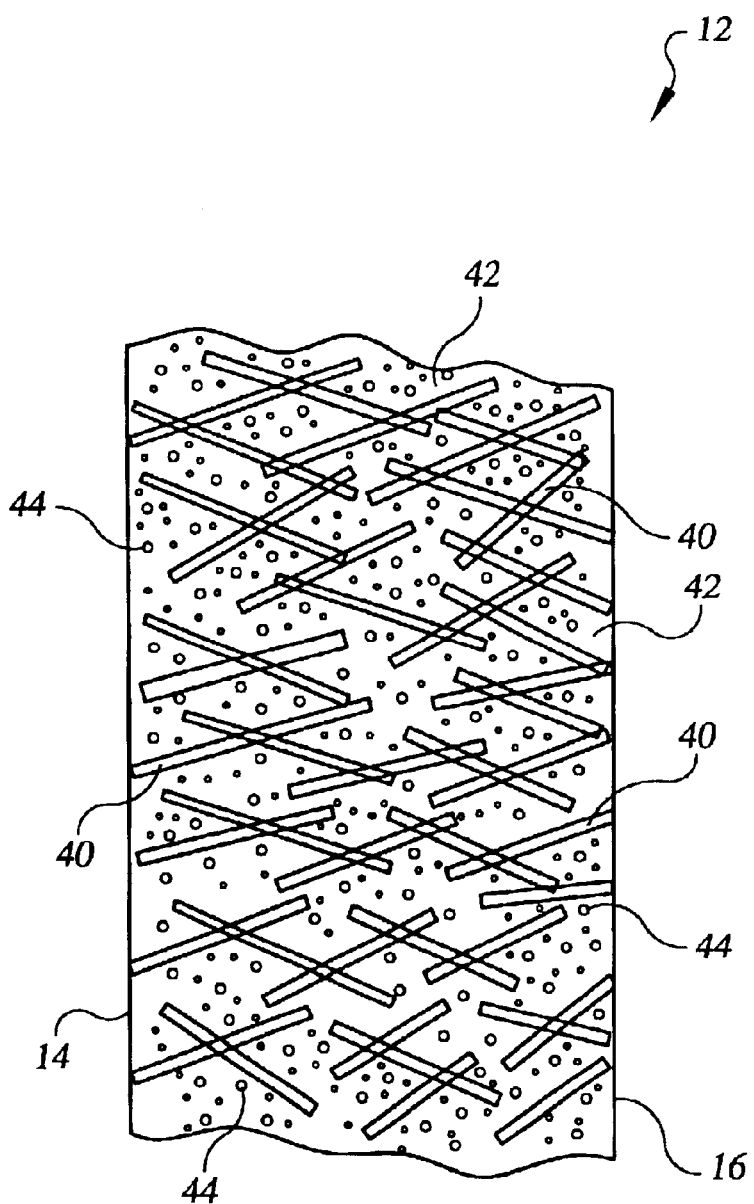
FIG. 2 is an expanded, fragmentary, cross section of the FIG. 1 high water permeability proton exchange membrane.

FIG. 2 shows an expanded, fragmentary cross section of the exemplary high water permeability PEM 12, including a section of the first catalyst surface 14 and opposed second catalyst surface 16. The high water permeability PEM 12 includes: a. between about 20 volume percent ("vol. %") and about 40 vol. % of a structural insulating phase 40; between about 50 vol. % and about 70 vol. % of a hydrated nanoporous ionomer phase 42; and, about 10 vol. % of a microporous water-filled phase 44. The structural insulating phase 40 is selected from the group consisting of a particulate material, a whisker material, or a fibrous material that are electronically non-conductive and compatible with an operating environment of an electrochemical cell. Exemplary structural insulating materials include silicon carbide, alumina, titania, zirconia, silica and glass. Exemplary structural insulating materials may also include materials making up an electrolyte retaining matrix utilized in phosphoric acid fuel cells, wherein the phosphoric acid is an electrolyte retained between electrodes by the retaining matrix, such as disclosed in U.S. Pat. No. 4,017,664 that issued on Apr. 12, 1977 to Breault, who is also the inventor of the high water permeability PEM 12 disclosed herein.

The hydrated nanoporous ionomer phase 42 consists of any suitable cation exchange resin that is compatible with an operating environment of an electrochemical cell. An exemplary material for constituting the hydrated nanoporous ionomer phase 42 is a perflourosulfonic acid ionomer sold under the brand name "NAFION" by the E.I. DuPont company of Wilmington, Del., U.S.A. that has open pores having a diameter of about 0.004 microns when the ionomer is hydrated. The microporous water-filled phase 44 consists of open pores having a diameter of between 0.3–1.0 microns defined within the hydrated nanoporous ionomer phase 42. By the phrase "open pores", it is meant that the pores provide an open channel for movement of water between the opposed first and second catalytic surfaces 14, 16 of the membrane 12. In a preferred embodiment, the thickness of the high water permeability PEM is between 10–25 microns. The thickness of the high water permeability PEM is defined as a shortest distance between the first and opposed second catalyst surfaces 14, 16.

The high water permeability PEM 12 may be understood as partially a hybrid of common perflourosulfonic acid ionomer membranes utilized in "PEM" fuel cells, and the electrolyte retaining matrix separators used in aqueous electrolyte cells, such as disclosed in the aforesaid U.S. Pat. No. 4,017,664. Known perflourosulfonic acid ionomer membranes typically have an average open pore diameter of about 4 nanometers, or 0.004 microns, with an average wetted porosity of about 40%, or about 26.5 weight percent water. Water permeability is a complicated function of diameter of open or through voids and porosity, as described by a "Carman-Kozeny" equation, known in the art. One mechanism to significantly increase water permeability is to increase a pore size or diameter of open pores or voids within the PEM into the micrometer range. A membrane with a pore size of 0.3 microns and a porosity of 10% has a permeability that is an order of magnitude higher than the standard, aforesaid "NAFION" PEM. A structure with a pore size of 1.0 microns and a porosity of 10% has a permeability that is two orders of magnitude higher than the "NAFION" PEM.

Composition ranges of the high water permeability PEM 12 are established as follows. A quantity of the structural insulating material is compressed in a suitable pellet press and the open porosity of the resulting pellet is determined as a function of pressure. The phrase "open porosity" is meant to describe voids that permit movement of a fluid through a thickness of the pellet. An open porosity at the highest pressure used in fabrication of the membrane is then defined, including a highest pressure in possible fabrication steps that involve lamination of the membrane to an electrode. The pellet of structural insulation material then defines an overall membrane volume of the resulting high water permeability PEM 12. A void volume may then be determined, which is the overall membrane volume minus the volume occupied by the structural insulating material. An amount of the hydrated nanoporous ionomer material is then selected to fill the void volume so that the ionomer material fills all but 10% of the overall membrane volume, based upon the hydrated density of the ionomer material. The pore size and porosity of the microporous range is then determined by measuring the pore size and porosity by porosimetery methods known in the art, and by selecting the diameter of the particulate or fibrous structural insulating materials to achieve a desired pore size and ionomer concentration range by methods known in the art.

As an example, a pellet made of silicon carbide whisker with a diameter of 1 micron and a length of 10 microns is presumed to have an open porosity at 3,500 kPa (500 psi) of 70%. Based upon that relationship, TABLE 1 shows the weight and volume percents required to fabricate a high water permeability PEM of the present invention that is 25 microns thick.

TABLE 1

| | Volume ul/cm² For A 25 Micron Thick PEM | Volume % | Weight mg/cm² For A 25 Micron PEM | Weight % |
| --- | --- | --- | --- | --- |
| Total | 2.54 | 100 | 4.96 | 100 |
| Structural Insulating Phase | 0.76 | 30 | 2.43 | 49 |
| Hydrated Nanoporous Ionomer Phase | 1.53 | 60 | 2.28 | 46 |
| Microporous Water-Filled Phase | 0.25 | 10 | 0.25 | 5 |

The data in TABLE 1 shows the weight ratios of the amount of the structural insulating material and hydrated nanoporous ionomer material necessary to fill all but 10% of the overall volume of a high water permeability PEM. An exemplary method of fabricating a high water permeability PEM with that information would be as follows. For every square centimeter of the desired 25 micron thick high water permeability PEM, 2.43 milligrams ("mg") of structural insulating material, such as silicon carbide whiskers, is dispersed in a solution of ethanol and 2.28 mg of the material making up the hydrated nanoporous ionomer phase, such as the aforesaid perflourosulfonic acid ("PFSA") ionomer. The ionomer material may be a 5% solution of PFSA in ethanol solution. The dispersion is heated to evaporate the ethanol and concentrate the suspension to a viscosity of approximately 1,000 cp. The concentrated suspension is then applied to a catalyzed surface of an electrode by rod coating to produce a dry film thickness of approximately 25 microns. The remaining ethanol is then removed by drying.

The electrode that is coated with the high water permeability PEM may be laminated to an uncoated electrode, as is known, to create a unitized electrode assembly. It is preferred that the coating be applied to each electrode of a fuel cell to provide redundancy and improve reliability. In such a circumstance of coating each electrode to form the opposed catalyst surfaces of the electrodes, each electrode would be coated with the high water permeability PEM to a thickness of 5–12.5 microns which is about half of a total thickness applied to each electrode. The high water permeability PEM may be applied to the catalyzed surface of an electrode by known coating methods, such as rod coating, gravure coating, slip casting, screen printing, curtain coating, or spraying.

The high water permeability PEM of the present invention may also be fabricated by forming the structural insulating materials into a non-woven paper that defines a total volume of the membrane. The non-woven paper is then impregnated with only enough of the material making up the hydrated nanoporous ionomer phase, such as a solution of ethanol and the aforesaid perflourosulfonic acid ionomer, to fill all but 10% of the total volume of the high water permeability PEM. The impregnated, non-woven paper is then dried to remove the ethanol, and to thereby form the high water permeability PEM.

The structural insulating phase 40 of the high water permeability PEM 12 provides a support structure that retains the porosity of the microporous water-filled phase throughout the lamination steps normally used to fabricate a PEM electrode. Additionally, the structural insulating phase provides an electronic insulator between the anode and cathode catalysts 18, 20 secured to the opposed first and second catalyst surfaces of the high water permeability PEM 12. The hydrated nanoporous ionomer phase 42 provides for proton conductivity between the anode and cathode catalysts 18, 20 within the fuel cell 10. The material making up the ionomer phase 42 may be heat treated or chemically treated to increase its durability, as is known in the art.

The microporous water-filled phase 44 provides improved water transport between the anode and cathode catalysts 18, 20. The pore size or diameter of the pores of this phase is between about 0.3 to 1.0 microns, and the microporous water-filled phase has an open porosity of between 5% and 15% of the volume of the high water permeability PEM 12. The interior surface of the pores must be wettable to water, which is an inherent condition of the perflourosulfonic acid ionomer. Additionally, the open pores of the microporous water-filled phase must be capable of providing a bubble pressure of 35 kPa (5 psig) or greater to prevent gas cross over from the anode electrode to the cathode electrode.

For purposes of clarity, in the description herein of the high water permeability PEM 12, use of the word "phase" after "structural insulating", "hydrated nanoporous ionomer", and "microporous water filled" is meant to describe those three components as being integrated into a unitary high water permeability PEM 12. Where the components are described prior to being integrated into the unitary PEM 12, they are frequently referred to as "structural insulating materials", or "materials making up the structural insulating phase", "hydrated nanoporous ionomer materials", or materials making up the hydrated nanoporous ionomer phase", etc.

While the present invention has been described and illustrated with respect to a particular construction of a high water permeability PEM 12 for use in an electrochemical cell, it is to be understood that the high water permeability PEM is not to be limited to the described and illustrated embodiments. For example, while the described high water permeability PEM 12 is deployed within the fuel cell 10 of FIG. 1, the PEM 12 may be utilized in other electrochemical cells, such as electrolysis cells, as well as in fuel cells having differing configurations than the FIG. 1 illustration, such as in fuel cells having sealed coolant or solid separator plates, etc. Consequently, reference should be made primarily to the following claims rather than the foregoing description to determine the scope of the invention.

What is claimed is:

1. A high water permeability proton exchange membrane (12) for use in an electrochemical cell, the membrane (12) comprising:
   a. between about 20 volume percent and about 40 volume percent of a structural insulating phase (40) selected from the group consisting of a particulate material, a whisker material, or a fibrous material, which materials are electronically non-conductive;
   b. between about 50 volume percent and about 70 volume percent of a hydrated nanoporous ionomer phase (42) consisting of a cation exchange resin; and,
   c. about 10 volume percent of a microporous water-filled phase (44) consisting of open pores having a diameter of between 0.3 and 1.0 microns defined within the hydrated nanoporous ionomer phase (42) so that water may flow through the open pores between a first catalytic surface (14) and an opposed second catalytic surfaces (16) of the high water permeability proton exchange membrane (12).

2. The high water permeability proton exchange membrane (12) of claim 1, wherein the membrane (12) has a thickness of between 10 and 25 microns, wherein the thickness is a shortest distance between the opposed catalytic surfaces (14), (16) of the membrane (12).

3. The high water permeability proton exchange membrane (12) of claim 1, wherein the hydrated nanoporous ionomer phase (42) includes open pores having a diameter of about 0.004 microns defined within the ionomer and a hydrated porosity of about 40 percent.

4. The high water permeability proton exchange membrane (12) of claim 1, wherein the membrane (12) provides a bubble pressure of 35 kPa or greater.

5. The high water permeability proton exchange membrane (12) of claim 1, wherein the structural insulating phase (40) further comprises materials selected from the group consisting of silicon carbide, alumina, titania, zirconia, silica, and glass, or mixtures thereof.

6. The high water permeability proton exchange membrane (12) of claim 1, wherein the structural insulating phase (40) comprises whiskers of silicon carbide having diameters of about 1 micron, and lengths of about 10 microns, and the hydrated nanoporous ionomer phase (42) comprises a perflourosulfonic acid ionomer.

7. A method of making a high water permeability proton exchange membrane (12), comprising the steps of:
   a. positioning a structural insulating material (40) to define an overall membrane volume, wherein the structural insulating material is selected from the group consisting of a particulate material, a whisker material, or a fibrous material, which materials are electronically non-conductive; and,
   b. filling all but 10 percent of the overall membrane volume with a hydrated nanoporous ionomer material (42), wherein the hydrated nanoporous ionomer material (42) is a cation exchange resin, so that a microporous water-filled phase (44) consisting of open pores having a diameter of between 0.3 and 1.0 microns is defined within the hydrated nanoporous ionomer material (42).

8. The method of making a high water permeability proton exchange membrane (12) of claim 7, comprising the further step of positioning the structural insulating material (40) to define an overall volume of the membrane (12) having a thickness of between 10 microns and 25 microns, wherein the thickness of the overall volume is a shortest distance between a first catalytic surface (14) and an opposed second catalytic surface (16) of the overall volume of the membrane (12).

9. The method of making a high water permeability proton exchange membrane (12) of claim 8, comprising the further step of filling all but 10 percent of the overall membrane volume with a hydrated nanoporous ionomer material (42) so that the membrane (12) provides a bubble pressure of 35 kPa or greater.

* * * * *